US012567961B2

(12) United States Patent
Cela et al.

(10) Patent No.: US 12,567,961 B2
(45) Date of Patent: Mar. 3, 2026

(54) SECURE ENVIRONMENT FOR OPERATIONS ON PRIVATE DATA

(71) Applicant: GOOGLE LLC, Mountain View, CA (US)

(72) Inventors: Carlos Cela, Mountain View, CA (US); John Tobler, Mountain View, CA (US); Brian Burdick, Mountain View, CA (US); Branton Horsley, Mountain View, CA (US); Mayank Patel, Mountain View, CA (US); Chanda Patel, Mountain View, CA (US); Asela Gunawardana, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 109 days.

(21) Appl. No.: 18/573,384

(22) PCT Filed: Feb. 15, 2023

(86) PCT No.: PCT/US2023/013142
§ 371 (c)(1),
(2) Date: Dec. 21, 2023

(87) PCT Pub. No.: WO2023/158695
PCT Pub. Date: Aug. 24, 2023

(65) Prior Publication Data
US 2024/0291650 A1 Aug. 29, 2024

Related U.S. Application Data

(60) Provisional application No. 63/268,060, filed on Feb. 15, 2022.

(51) Int. Cl.
*H04L 9/08* (2006.01)
*G06F 21/53* (2013.01)
(Continued)

(52) U.S. Cl.
CPC .............. *H04L 9/088* (2013.01); *G06F 21/53* (2013.01); *H04L 9/30* (2013.01); *H04L 9/3236* (2013.01); *G06F 2221/034* (2013.01)

(58) Field of Classification Search
CPC .......... G06F 21/53; H04L 9/30; H04L 9/3236
See application file for complete search history.

(56) References Cited

U.S. PATENT DOCUMENTS 11,363,012 B1 * 6/2022 Chhabra ............... H04L 9/0894
2008/0031460 A1 2/2008 Brookner et al.
(Continued)

OTHER PUBLICATIONS

International Search Report and Written Opinion for Application No. PCT/US2023/013142, dated May 17, 2023.

*Primary Examiner* — Hee Soo Kim
(74) *Attorney, Agent, or Firm* — MARSHALL, GERSTEIN & BORUN LLP

(57) ABSTRACT

The techniques disclosed herein provide a secure control plane (SCP), which in turn provides an isolated secure execution environment for a data plane (DP). Any arbitrary business logic can execute within the DP, and all sensitive data traversing the SCP and entering the DP is encrypted. Split keys generated outside the DP are assembled within, and only within, the DP, where they are used to decrypt sensitive data, enabling the business logic to perform computations using the sensitive data within the secure execution environment. The DP also provides attestation for the business logic executing within the DP, enabling outside parties to verify that the deployed business logic matches published logic. In the event of proprietary logic that is not published, techniques are also disclosed herein that enable verification that proprietary business logic deployed on the DP adheres to security policies.

20 Claims, 6 Drawing Sheets

(51) Int. Cl.
    *H04L 9/30*         (2006.01)
    *H04L 9/32*         (2006.01)

(56)             References Cited

U.S. PATENT DOCUMENTS

| | | | |
|---|---|---|---|
| 2018/0307854 A1* | 10/2018 | Bernau | G06Q 40/12 |
| 2019/0121960 A1* | 4/2019 | Brown | G06F 21/74 |
| 2020/0342092 A1* | 10/2020 | Wei | G06F 21/6218 |
| 2022/0284100 A1* | 9/2022 | Simon | H04L 63/06 |
| 2023/0308358 A1* | 9/2023 | Chitalia | H04L 41/22 |
| 2025/0016011 A1* | 1/2025 | Hamiel | H04L 9/3255 |

* cited by examiner

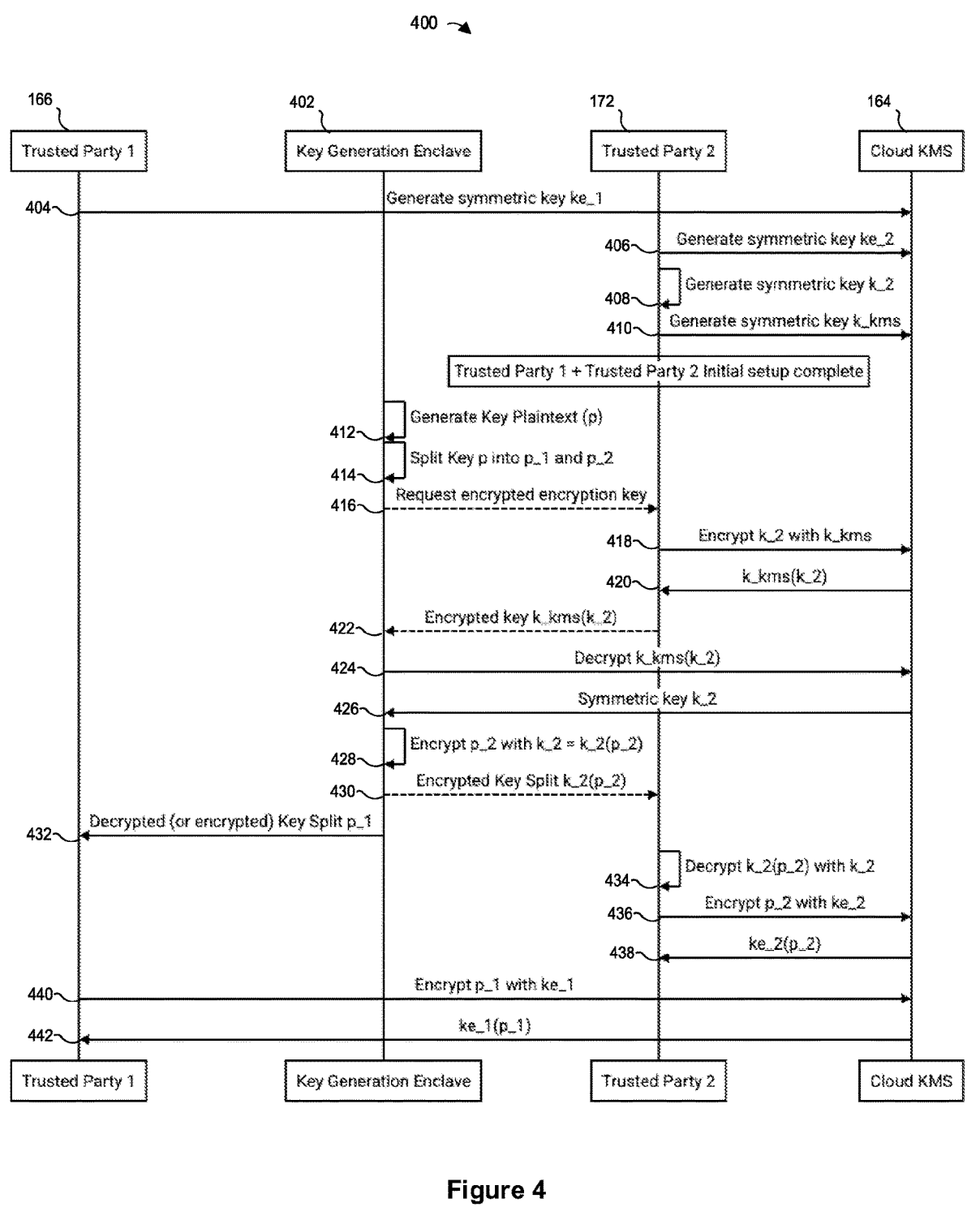

400

| 166 | 402 | 172 | 164 |
|---|---|---|---|
| Trusted Party 1 | Key Generation Enclave | Trusted Party 2 | Cloud KMS |

404 — Generate symmetric key ke_1

406 — Generate symmetric key ke_2

408 — Generate symmetric key k_2

410 — Generate symmetric key k_kms

Trusted Party 1 + Trusted Party 2 Initial setup complete

412 — Generate Key Plaintext (p)

414 — Split Key p into p_1 and p_2

416 — Request encrypted encryption key

418 — Encrypt k_2 with k_kms

420 — k_kms(k_2)

422 — Encrypted key k_kms(k_2)

424 — Decrypt k_kms(k_2)

426 — Symmetric key k_2

428 — Encrypt p_2 with k_2 = k_2(p_2)

430 — Encrypted Key Split k_2(p_2)

432 — Decrypted (or encrypted) Key Split p_1

434 — Decrypt k_2(p_2) with k_2

436 — Encrypt p_2 with ke_2

438 — ke_2(p_2)

440 — Encrypt p_1 with ke_1

442 — ke_1(p_1)

| Trusted Party 1 | Key Generation Enclave | Trusted Party 2 | Cloud KMS |

Figure 4

SECURE ENVIRONMENT FOR OPERATIONS ON PRIVATE DATA

FIELD OF THE DISCLOSURE

This disclosure relates to a secure computing environment and, more particularly, to techniques for improving the security and privacy of using Trusted Execution Environments (TEEs) for operations on private and/or sensitive data, implemented in a cloud or another suitable environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the number and complexity of tasks executing in cloud computing environments increases, so do concerns regarding security and protection of privacy, particularly when multiple parties are involved in a shared task. For example, several parties that do not trust each other can jointly process data where one party controls one subset of the data, and another party controls another part of the data. It is desirable for the computing environment to protect sensitive information from extraction by any one party, protect the code that operates on the data from tampering, etc.

SUMMARY

The techniques disclosed herein provide a secure control plane (SCP), which in turn provides an isolated secure execution environment for a data plane (DP). Any arbitrary business logic can execute within the DP, and all sensitive data traversing the SCP and entering the DP is encrypted. Split keys generated outside the DP are assembled within, and only within, the DP, where they are used to decrypt sensitive data, enabling the business logic to perform computations using the sensitive data within the secure execution environment. The DP also provides attestation for the business logic executing within the DP, enabling outside parties to verify that the deployed business logic matches published logic. In the event of proprietary logic that is not published, techniques are also disclosed herein that enable verification that proprietary business logic deployed on the DP adheres to security policies.

BRIEF DESCRIPTION OF THE DRAWINGS

FIG. 4 is a messaging diagram illustrating an example scenario in which two trusted parties each receive a portion of a private key.

DETAILED DESCRIPTION OF THE DRAWINGS

Figure 1:
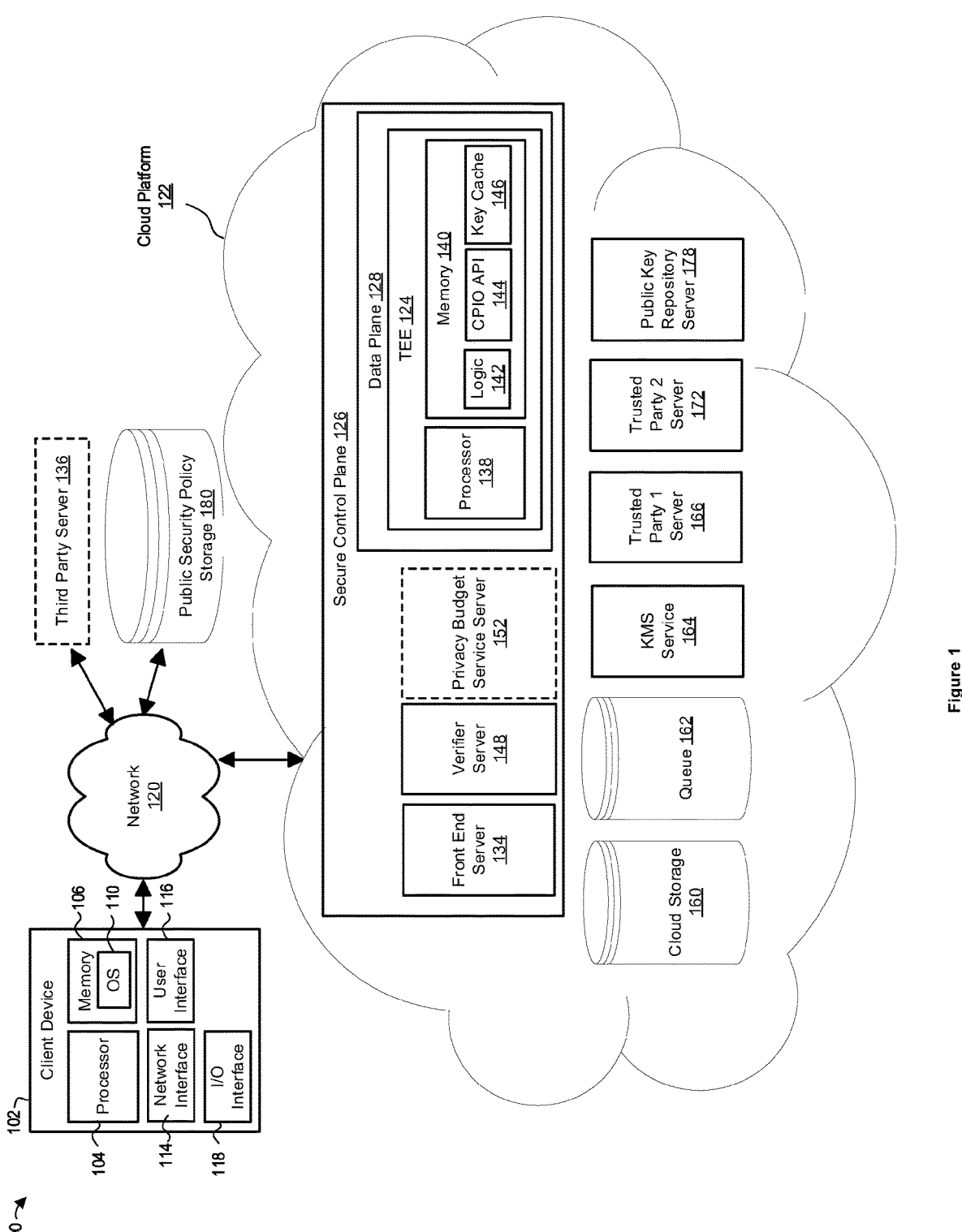
FIG. 1 is a block diagram of an example computing system in which the techniques of this disclosure can be implemented.

As the number of workflows utilizing first-party (1P) data in the cloud grows, new trust, privacy, and security paradigms are being considered to advance the guarantees given to data owners. These include using Trusted Execution Environments (TEEs), such as enclaves, confidential computing, and Secure Multi-Party Computation (MPC). The techniques discussed below improve data security in TEEs running implemented in the cloud or another suitable computing environment.

Further, techniques are also disclosed for enabling privacy and security guarantees concerning proprietary business logic code, i.e., code that cannot be audited by a third party, to be given within a TEE implemented on a cloud service, even without disclosing the actual business logic.

The secure control plane (sometimes referred to herein as "SCP"), described herein provides a non-observable secure execution environment where a service can be deployed. In particular, arbitrary business logic (e.g., code for an application) providing the service can be executed within the secure execution environment in order to provide the security and privacy guarantees needed by the workflow, with no computation at runtime observable by any party. The state of the environment is opaque even to the administrator of the service, and the service can be deployed on any supported cloud.

As one example, two clients producing data, client 1 and client 2, may wish to combine the data streams they receive from their respective customers, such that the clients can generate quantitative metrics related to these customers, where the quantitative metrics cannot be derived from their individual datasets. As a more particular example, client 1 can be a retailer that has data indicative of customer transactions, and client 2 can be an analytics engine capable of measuring the effectiveness of advertisement campaigns for products offered by the retailer, for example.

Client 2 may provide a service with algorithms that client 2 claims will perform data analysis securely. However, the client 1 may not wish to expose its customer data to client 2 in a manner that would potentially allow the data to be exfiltrated or used in a manner that does not adhere to privacy and security guarantees of client 1. Client 1 therefore would like to ensure that (1) its customer data cannot be exfiltrated by client 2 or any other party, and (2) the logic being used to analyze the customer data adheres to the security requirements of client 2. The techniques disclosed herein provide a secure execution environment in which the business logic executes, such that sensitive data analyzed by the business logic remains encrypted everywhere except within the secure execution environment, and provide attestation such that any party can ensure that the logic running within the secure execution environment performs as guaranteed.

Generally speaking, the service performing the computation (i.e., processing an event or request using business logic) is split between a data plane (DP) and a secure control plane (SCP). The business logic specific for the computation is hosted within the DP, where the DP is within a TEE, also referred to herein as an enclave. The business logic may be provided to the DP as a container, where a container is a software package containing all of the necessary elements to run the business logic in any environment. The container may, for example, be provided to the SCP by the business logic owner. Functionally, the SCP provides a secure execution environment and facilities to deploy and operate the DP at scale, including managing cryptographic keys, buffering requests, keeping track of the privacy budget, accessing storage, orchestrating a policy-based horizontal autoscaling, and more. The SCP execution environment isolates the DP from the specifics of the cloud environment, allowing for the service to be deployed on any supported cloud vendor without changes on the DP. Both DP and SCP work together by communicating through an Input/Output (I/O) Application Programming Interface (API), also referred to herein as a Control Plane I/O API, or CPIO API.

In an example implementation, all data traversing the SCP is always encrypted, and only the DP has access to the decryption keys. For example, the SCP can facilitate a trusted data exchange, in which data from multiple parties, which may not trust each other, can be joined, but where none of these multiple parties has access to the keys for decrypting this data. Further, the decryption keys, when outside the DP, may be bit-split, such that only the DP can assemble the decryption keys within the TEE. Depending on the desired application, the output from the DP can be redacted or aggregated in such a way that the output can be shared and no individual user's data can be identified or exfiltrated.

The SCP provides several privacy, trust, and security guarantees. With regard to privacy, services using the SCP can provide guarantees that no stakeholder (e.g., a device operated by a client, the cloud platform, a third party) can act alone to access or exfiltrate cleartext (i.e., non-encrypted), sensitive information, including the administrator of the SCP deployment. Further, with regard to trust, the DP is running in a secure execution environment with a trusted state at the time the enclave is started. For example, the SCP may be implemented using technologies to guarantee process isolation in hardware either, including memory encryption and or memory address space segmentation, and a chain of trust from boot, using a Trusted Platform Module (TPM) or Virtual Trusted Platform Module (vTPM), in accordance with Secure Boot standards, and/or using a trusted and/or certified operating system (OS). Starting from an audited codebase and a reproducible build, cryptographic attestation is used to prove the DP binary identity and provenance at runtime (as will be discussed in more detail below) to a key management service (KMS) which is configured to release cryptographic keys only to verified enclaves. As a result, any tampering of the DP image results in a system that is unable to decrypt any data. The cloud provider is implicitly trusted given the strong incentives the cloud provider has to guarantee its Terms of Service (ToS) guarantees. With regard to security, the secure execution environment is non-observable. The memory of the secure execution environment is encrypted or otherwise hardware-protected from access from other processes. Core dumps are not possible in an example implementation. All data is encrypted in transit and at rest, and all I/O from/to the DP is encrypted. No human has access to the private keys in cleartext (e.g., KMS is locked-down, keys are split, and keys are only available within the DP, which is within the secure execution environment.

The SCP distributes trust in a way that three stakeholders need to cooperate in order to exfiltrate cleartext user event data. The SCP also uses the distributed trust model to guarantee that two stakeholders need to cooperate to tamper with the privacy budget service. Distributed trust is used for both event decryption and a privacy budget service. Regarding event decryption, the private key needed to decrypt events received at the SCP is generated in a secure environment and bit-split between at least two KMSs, each under the control of an independent Trusted Party. Each Trusted Party, for example, can further encrypt their respective key split with a KMS key owned by the Trusted Party in the cloud provider's KMS. The KMSs are configured to only release key material to a DP that matches a specific hash. If the DP is tampered with, the key splits will not be released. In such a scenario, the service can be launched but will not be able to decrypt any event. Similarly, the privacy budget service may be distributed between two independent Trusted Parties and may use transactional semantics to guarantee that both Trusted Parties' budgets match, which allows for the detection of budget tampering.

The SCP, as will be discussed with reference to FIG. 2B, also provides mechanisms for attesting that any business logic running on the DP corresponds to the publicly released code, allowing other parties to verify the business logic being used to analyze sensitive data. The full codebase for the business logic (with the exception of scenarios described with reference to FIG. 5 involving proprietary business logic) is available to all stakeholders to examine and audit. Builds are reproducible, and any stakeholder can build the DP container. Building the DP container generates a set of cryptographic hashes (e.g., Platform Configuration Registers (PCRs)). All parties can therefore verify that the deployed products match the published codebase by comparing the hashes. The Trusted Parties publish the hashes to parties requesting to verify the built logic. KMSs, for example, are configured to only release key material to images matching the hashes generated from building the published logic. This guarantees that the private keys to decrypt sensitive information are only available to the images that correspond to a specific commit of a specific repository.

Turning to an example computing system that can implement the SCP of this disclosure, FIG. 1 illustrates an example computing system 100. The computing system 100 includes a client computing device 102 (also referred to herein as the client device 102), coupled to a cloud platform 122 (also referred to herein as the cloud 122) via a network 120. The network 120 in general can include one or more wired and/or wireless communication links and may include, for example, a wide area network (WAN) such as the Internet, a local area network (LAN), a cellular telephone network, or another suitable type of network or combination of networks. While the examples of this disclosure primarily refer to a cloud-implemented architecture, it should be understood that the techniques disclosed herein, including techniques for providing a secure execution environment in which to process sensitive data, for generating, splitting, and distributing keys, and for providing a mechanism by which to verify proprietary business logic, can be applied in non-cloud systems as well.

The client device 102 may be a portable device such as a smart phone or a tablet computer, for example. The client device 102 may also be a laptop computer, a desktop computer, a personal digital assistant (PDA), a wearable device such as a smart glasses, or other suitable computing device. The client device 102 may include a memory 106, one or more processors (CPUs) 104, a network interface 114, a user interface 116, and an input/output (I/O) interface 118. The client device 102 may also include components not shown in FIG. 1, such as a graphics processing unit (GPU). The client device 102 may be associated with a service user, who is an end user of the service provided by the SCP, discussed below. The end user operates the client device 102 (or, more specifically, the browser or application on the client device 102) that transmits requests/events to the service. To send a request or event to the service, the client device 102 encrypts the request/event using a public key, which the client device 102 can retrieve from a public key repository (e.g., a public key repository server 178). The client device 102 is exemplary only. As discussed below, the cloud platform 122 may receive incoming events and/or requests from the client device 102, from a browser/application/client process executing on the client device 102, or from another computing device issuing requests on behalf of the client device 102 or forwarding requests from the client device 102. Further, while only one client device is illustrated in FIG. 1, the computing system 100 may include multiple client devices capable of communicating with the cloud platform 122.

The network interface 114 may include one or more communication interfaces such as hardware, software, and/or firmware for enabling communications via a cellular network, a WiFi network, or any other suitable network such as the network 120. The user interface 116 may be configured to provide information, such as responses to requests/events received from the cloud platform 122 to the user. The I/O interface 118 may include various I/O components (e.g., ports, capacitive or resistive touch sensitive input panels, keys, buttons, lights, LEDs). For example, the I/O interface 118 may be a touch screen.

The memory 106 may be a non-transitory memory and may include one or several suitable memory modules, such as random access memory (RAM), read-only memory (ROM), flash memory, other types of persistent memory, etc. The memory 106 may store machine-readable instructions executable on the one or more processors 104 and/or special processing units of the client device 102. The memory 106 also stores an operating system (OS) 110, which can be any suitable mobile or general-purpose OS. In addition, the memory 106 can store one or more applications that communicate data with the cloud platform 122 via the network 120. Communicating data can include transmitting data, receiving data, or both. For example, the memory 106 may store instructions for implementing a browser, online service, or application that requests data from/transmits data to an application (i.e., business logic) implemented on the DP of a secure execution environment on the cloud platform 122, discussed below.

The cloud platform 122 may include a plurality of servers associated with a cloud provider to provide cloud services via the network 120. The cloud provider is an owner of the cloud platform 122 where an SCP 126 is deployed. While only one cloud platform is illustrated in FIG. 1, the SCP 126 may be deployed on multiple cloud platforms, even if those cloud platforms are operated by different cloud providers. The servers providing the cloud platform 122 may be distributed across a plurality of sites for improved reliability and reduced latency. Individual servers or groups of servers within the cloud platform 122 may communicate with the client device 102 and with each other via the network 120. Example servers that may be included in the cloud platform 122 are discussed in further detail below. While not illustrated for each server in FIG. 1, each server included in the cloud platform 122 may include one or more processors, similar to the processor(s) 104, adapted and configured to execute various software stored in one or more memories, similar to the memory 106. The servers may further include databases, which may be local databases stored in memory of a particular server or network databases stored in network-connected memory (e.g., in a storage area network). The servers also may include network interfaces and I/O interfaces, similar to the interfaces 114 and 118, respectively. Further, it should be understood that while certain components are described as an individual server, generally speaking, the term "server" may refer to one or more servers. Moreover, while functions are generally described as being performed by separate servers, some functions described herein may performed by the same server.

The cloud platform 122 includes the SCP 126, which includes a TEE 124. The TEE 124 is a secure execution environment where the DP 128 is isolated. A TEE, such as the TEE 124, is an environment that provides execution isolation and offers a higher level of security than a regular system. The TEE 124 may utilize hardware to enforce the isolation (referred to as confidential computing). The cloud provider is considered the root of trust of the SCP 126, abiding by the Terms of Service (ToS) agreement of the cloud platform 122. The hardware manufacturer of the servers providing the TEE 124 also have ToS guarantees, and therefore also provide additional layers of trust. The SCP 126 also utilizes techniques to guarantee that the state at boot time is safe, including using a minimalistic OS image recommended by the cloud provider, and using a TPM/vTPM-based secure boot sequence into that OS image.

One or more servers of the cloud platform 122 perform control plane (CP) functions (i.e., to support the SCP 126), and one or more servers perform data plane (DP) functions. For example, CP functions including key management and privacy budgeting services can be distributed across more than one Trusted Party. All functions of the DP 128 are carried out by processes within the TEE 124. Depending on the implementation, there may be more than one TEE per DP server. The TEE 124 may be deployed and operated by an administrator. The administrator can audit the logic to be implemented on the DP 128 and verify against a hash of the binary image to deploy the logic 142. On the CP, there may be a front end server or process 134 that receives external requests/event indications (e.g., from the client device 102), buffers requests/events until they can be processed by the DP 128, and forwards received requests to the DP 128. Generally speaking, as used herein, a request may also refer to an event, or may include one or more events, unless otherwise noted. In some implementations, there is a third party server 136 between the client device 102 and the SCP 126. The third party server 136 (which may include one or more servers, and might or might not be hosted on the cloud platform 122) may be responsible for receiving requests (which are encrypted by the client device 102) from the client device 102 and later dispatching the encrypted requests to the SCP 126. In some cases, the third party is the administrator of the service. The third party server 136 does not have keys with which to decrypt the requests. The third party server 136 may, for example, aggregate requests into batches and store the batches (e.g., on cloud storage 160). The third party server 136 or cloud storage server 160 may notify the front end server 134 that requests are ready to be processed, and/or the front end server 134 may subscribe to notifications that are pushed to the front end server 134 when batches are added to the cloud storage 160.

The DP 128 includes a server (which may include one or more servers), which includes one or more processors 138 (similar to the processor(s) 104), and one or more memories 140 (similar to the memory 106). The memory 140 includes business logic 142 (also referred to as the logic 142), which may be executed by the processor 138. The business logic 142 is for implementing whichever application or service is being deployed on the TEE 124. The memory 140 also may store a key cache 146, which stores cryptographic keys for encrypting and decrypting communications. Further, the memory 140 includes a CPIO API 144, which includes a library of functions for communicating with other elements of the cloud platform 122, including components on the CP of the SCP 126. The CPIO API 144 can be configured to interface with any cloud platform provided by cloud provider. For example, in a first deployment, the SCP 126 may be deployed to a first cloud platform provided by a first cloud provider. The DP 128 hosts the particular business logic 142, and the CPIO API 144 facilitates communications between the logic 142 and the first cloud platform. In a second deployment, the SCP 126 may be deployed to a second cloud platform provided by a second cloud provider. The DP 128 can host the same business logic 142 as the first deployment, and the CPIO API 144 is configured to facilitate communications between the logic 142 and the second cloud platform. Thus, the SCP 126 can be deployed to different cloud platforms without editing the underlying business logic 142, and only configuring the CPIO API 144 to interface with the particular cloud platform.

There may be additional CP-level services provided by servers of the cloud platform 122 that support the SCP 126. For example, a verifier server 148 may provide a verifier module capable of verifying whether the business logic 142 conforms to a security policy, as will be discussed below with reference to FIG. 5. While not explicitly illustrated in FIG. 1, the verifier module can operate within the TEE 124. As another example, a privacy budget service server 152 may implement a privacy budget service that verifies whether the privacy budget for a user or device has been exhausted. One or more privacy budget services, additionally or alternatively, may be implemented by Trusted Parties, as discussed with reference to FIG. 2B.

Additionally, the cloud platform 122 may include other servers and databases in communication with the SCP 126, as described in the following paragraphs. These servers may facilitate the CP functions of the SCP 126. In particular, CP functions may be distributed across several servers, as will be discussed below. Processes of the DP 128, however, remain within the TEE 124 and are not distributed outside of the TEE 124.

Cloud storage 160 may store encrypted batches of requests, as mentioned above, before the encrypted batches are received by the front end server 134. The cloud storage 160 may also be used to store responses, after the DP 128 has processed a received request, or to perform storage functions of other components of the cloud platform 122. Queue 162 may be used by the front end server 134 to store pending requests before they can be analyzed by the DP 128. For example, after receiving a request from the client device 102, the front end server 134 can receive the request and temporarily store the pending request in the queue 162 until the DP 128 is ready to process the request. As another example, after receiving a notification that a batch of requests from the third party server 136 is stored within the cloud storage 160, the front end 134 can retrieve the batch and place the batch in the queue 162 where the batch awaits analysis by the DP 128.

The KMS service 164 provides a KMS, which generates, deletes, distributes, replaces, rotates, and otherwise manages cryptographic keys. The functions of the KMS 164 may be executed by one or more servers. Thus, the KMS 164 may be a cloud KMS. The Trusted Party 1 server 166 and the Trusted Party 2 server 172 are servers associated with a Trusted Party 1 and a Trusted Party 2, respectively, that provide the functionality of each Trusted Party. While FIG. 1 illustrates only two Trusted Parties, the cloud platform 122 may include multiple Trusted Parties. Each Trusted Party may manage the privacy budget, and can also audit the logic 142 implemented on the DP 128 to verify the build product against the hash of the published logic. Trusted Parties own the creation and management of the asymmetric keys used for encryption and decryption of user data. The Trusted Parties may securely generate keys and publish public keys to the world. Private keys, as will be discussed in detail with reference to FIG. 4, can be bit-split into two parts (one split under the control of each Trusted Party, although any number of N-splits can also be supported, e.g., in the case where there are N Trusted Parties). An envelope-encryption technique may be used in which each Trusted Party encrypts its split for each key with a KMS's symmetric key and saves the encrypted split in their repository. Envelope encryption allows for rotation of the envelope without necessarily rotating the key within the envelope. Public keys may be stored and managed by a public key repository server 178. Additionally or alternatively, the KMS server 164 may manage public keys.

The computing system 100 may also include public security policy storage 180, which may be located on or off the cloud platform 122. The public security policy storage 180 stores security policies such that the security policies are accessible by the public (e.g., by the client device 102, by components of the cloud platform 122). A security policy (also referred to herein as a policy) describes what actions or fields are allowed in order to compose the output of a service. A policy can also be described as a machine-readable and machine-enforceable Privacy Design Document (PDD). Policies will further be described with reference to FIG. 5.

Figure 2A:
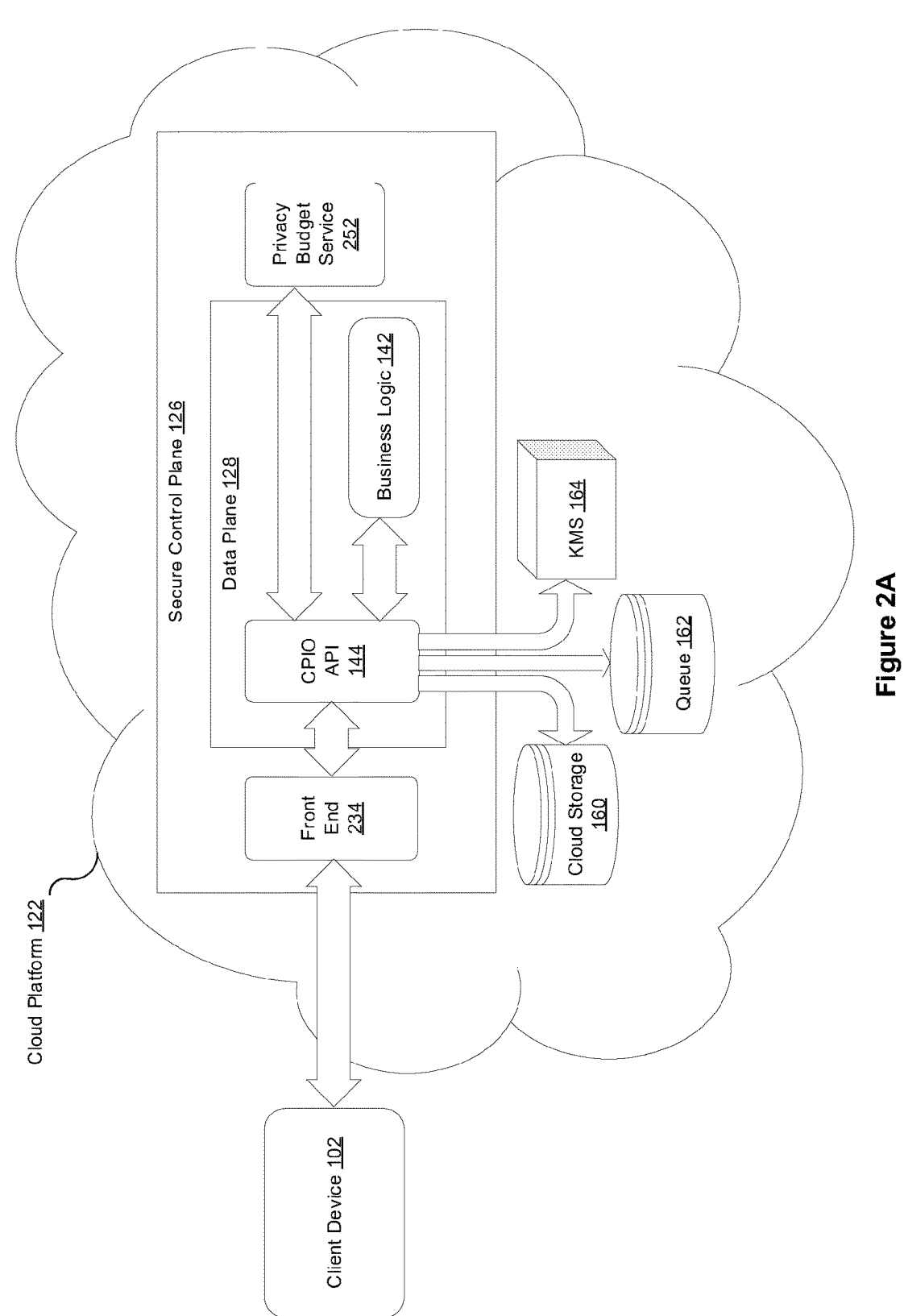
FIG. 2A is a block diagram illustrating an example computing architecture including a secure control plane and a data plane of this disclosure.

Referring next to FIG. 2A, an example architecture 200A is illustrating depicting connections between components and software elements of the computing system 100. The client device 102 can retrieve public keys (e.g., from the public key repository server 178) in order to address requests to the service being implemented on the DP 128 (i.e., by the business logic 142). For example, the client device 102 may initiate a request to access content provided by the service, or may issue an event including user behavior data.

Encrypted requests from the client device 102 are received first by a front end module 234 (i.e., a module implemented by the front end server 134) of the SCP 126. In some implementations, the requests are first received by a third party that batches the requests before notifying the front end 234 (or causing the front end 234 to be notified). The notification to the front end 234 may contain the location within the cloud storage 160 (e.g., the location of a cloud storage bucket) where the encrypted requests reside, and may contain an indication of where output from the DP 128 should be outputted (e.g., by including metadata indicating such information). In such cases, the front end 234 may retrieve the encrypted requests from the cloud storage 160. In any event, the front end 234 passes encrypted requests to the DP 128 using functions defined by the CPIO API 144. The front end 234 may store encrypted requests in the queue 162 until the DP 128 is ready to process the requests and retrieves the requests from the queue 162. The DP 128 decrypts the requests and processes the requests in accordance with the business logic 142. Decrypting the requests may include communicating with the KMS 164 (e.g., a cloud KMS implemented by distributed servers) to retrieve and assemble private keys for decrypting the requests, and/or with Trusted Parties, as in FIG. 2B. These are examples of integration of cloud native services with the SCP 126, but the idea extends to other cloud infrastructure and services, with the SCP 126 mediating between these services and the business logic 142 by using the CPIO API 144 for translating the semantics to make the business logic 142 agnostic of the specific cloud environment.

Processing the requests may include communicating with a privacy budget service 252 (e.g., implemented by the privacy budget service server 152), using the CPIO API 144 functions, to check the privacy budget and ensure compliance with the privacy budget. The privacy budget keeps track of requests and events that have been processed. There may be a maximum number of requests originating from a specific user, for example, that can be processed during a particular computation or period. Ensuring compliance with a privacy budget prevents parties analyzing the output from the DP 128 from extracting information regarding a specific user. By checking compliance with the privacy budget, the DP 128 provides a differentially private output.

The results from processing the requests can be encrypted by the DP 128, and can be redacted and/or aggregated such that the output does not reveal information concerning specific users. The DP 128 can store the results in, for example, the cloud storage 160, where the results can be retrieved by parties having the decryption key for the results. As one example, if processing results for the third party server 136, the DP 128 can encrypt the results using a key that the third party server 136 can decrypt.

Figure 2B:
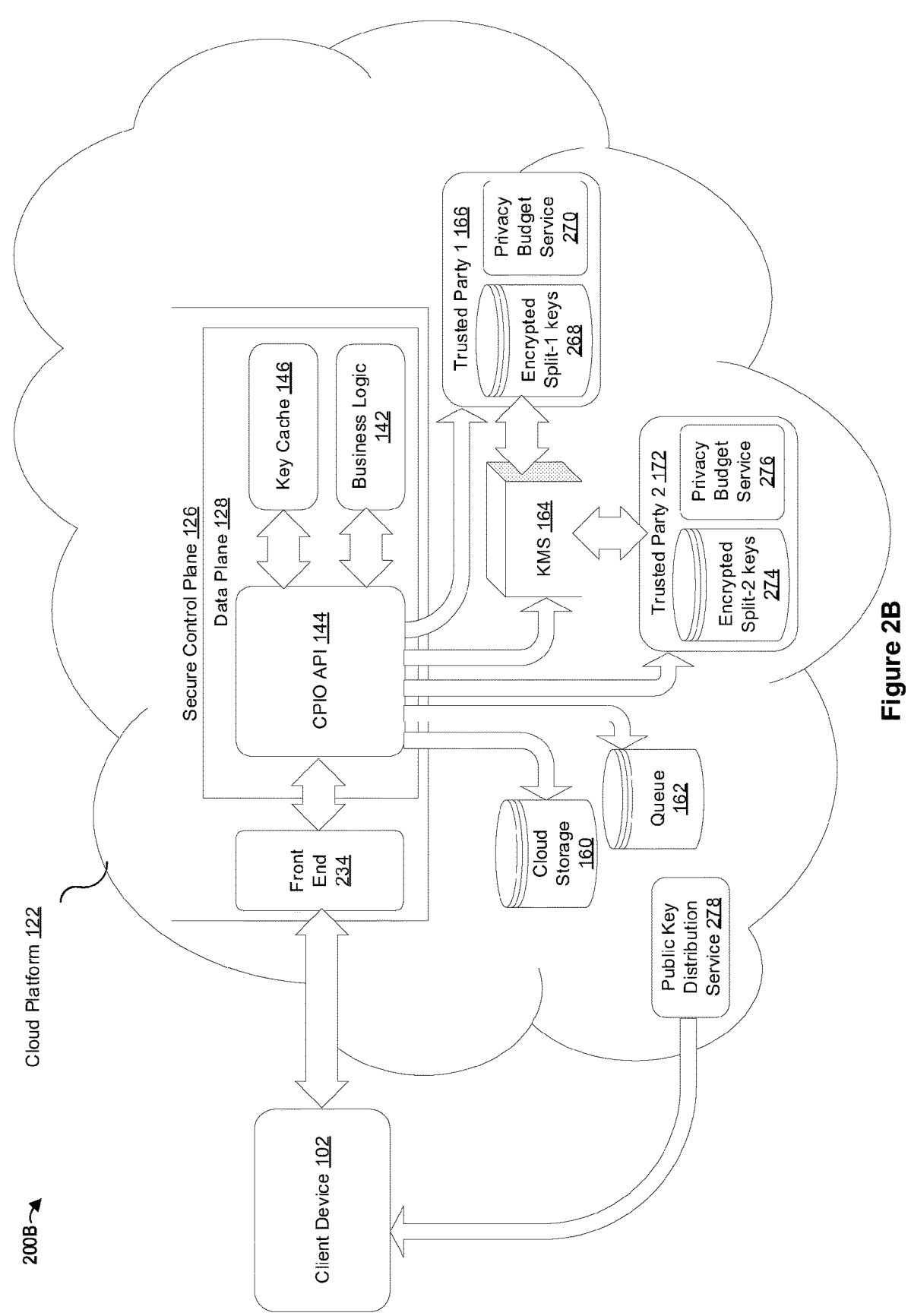
FIG. 2B is a block diagram illustrating another example computing architecture similar to FIG. 2A, except that FIG. 2B illustrates additional infrastructure for managing cryptographic keys and privacy budget.

Turning to FIG. 2B, an architecture 200B is similar to the architecture 200A, except that additional details are illustrated regarding key management and privacy budget. In comparison to FIG. 2A, FIG. 2B also illustrates the Trusted Party 1 server 166 (referred to herein as Trusted Party 1 166 for brevity), the Trusted Party 2 server 172 (referred to herein as Trusted Party 2 172 for brevity), and the public key distribution service 278. The public key distribution service 278 provides public keys to the client device 102, which the client device 102 can use to address requests to the DP 128, front end 234, or third party server 136 that aggregates requests (not shown in FIG. 2B). The public key distribution service 278 may be operated by the public key repository server 178, or by the KMS server 164. The Trusted Party 1 166 includes a key cache 268 containing encrypted split-1 keys (i.e., an encrypted first portion of a private key), whereas the Trusted Party 2 172 includes a key cache 274 containing encrypted split-2 keys (i.e., an encrypted second portion of the private key). Each of the Trusted Parties 166, 172 may also provide a privacy budget service 270, 276, and may each manage an instance of the privacy budget. Distributing management of the privacy budget to two Trusted Parties helps to ensure that no one Trusted Party can tamper with the privacy budget. Both privacy budget services 270, 276 should enforce the same privacy budget; thus, if the two services return different outputs, the SCP 126 can recognize that one of the Trusted Parties 166, 172 has tampered with the privacy budget. The architecture illustrated in FIG. 2B prevents any one Trusted Party from having total control over private decryption keys or the privacy budget. A single Trusted Party cannot act alone to provide unlimited budget to any user, and therefore a single Trusted Party cannot aggregate the same batch of data repeatedly.

Figure 3:
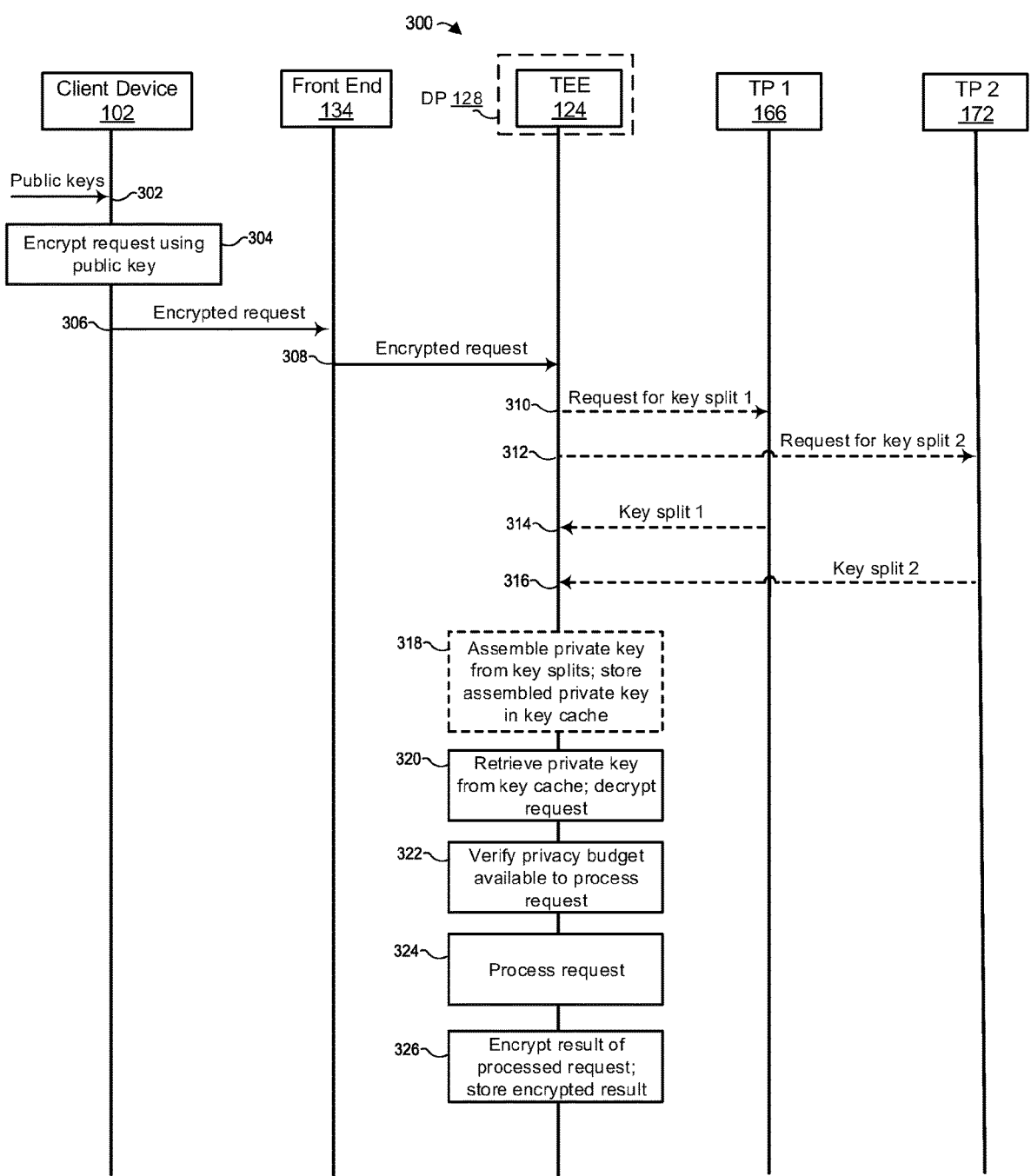
FIG. 3 is a messaging diagram illustrating an example scenario in which the control plane of FIGS. 2A-2B receives a request to perform a computation using the logic executing on the data plane.

The elements illustrated in the architecture 200B can implement the actions illustrated in FIG. 3.

During an example scenario 300, illustrated in FIG. 3, the client device 102 retrieves 302 public keys from a public key distribution service 278 (which may be implemented by the public key repository server 178, or may be provided by the KMS 164). The client device 102 encrypts 304 a request for the service implemented on the TEE 124 using a public key associated with the service. The client device 102 then sends 306 the encrypted request to the front end server 134. As explained previously, in some implementations, the third party server 136 receives the encrypted request before the request reaches the front end server 134, and stores the encrypted request in the cloud storage 160, where the encrypted request can be retrieved by the front end server 134. The front end server 134 passes 308 the encrypted request to the DP 128. The business logic 142 retrieves the encrypted request for processing, and attempts to retrieve the decryption key from the key cache 146. If the business logic 142 retrieves the decryption key, the scenario continues from event 308 to event 320.

If the decryption key is not present in the key cache 146, the business logic 142 requests, using the CPIO API 144, the decryption key. More particularly, the DP 128 sends 310 a request for key split 1 to the Trusted Party 1 166, and sends 312 a request for key split 2 to the Trusted Party 2 172. In response, the Trusted Party 1 166 sends 314 the key split 1 to the DP 128, and the Trusted Party 2 172 sends 316 the key split 2 to the DP 128. The key splits 1 and 2 may be encrypted when received 314, 316 by the DP 128 with symmetric keys generated by the Trusted Party 1 166 and the Trusted Party 2 172, respectively. Accordingly, the DP 128 may also need to request decryption of the key splits by, for example, the KMS 164 (i.e., a cloud KMS), which may store the symmetric keys operated by the Trusted Parties 166, 172.

Before sending 314 and 316 the key splits to the DP 128, the Trusted Parties 166, 172 may first verify that the business logic 142 corresponds to the code publicly released on a commit of a code repository. This can be accomplished through attestation. The codebase of the business logic 142 is available to all stakeholders (the client device 102, the Trusted Parties 166, 172, the cloud platform 122, the administrator, third parties, etc.) to examine and audit. As discussed above, any stakeholder can build the DP container including the business logic 142 and generate PCRs for the published logic. Thus, any party can verify that the business logic 142 built and deployed on the DP 128 matches the published codebase by comparing PCRs of the deployed business logic 142 against PCRs of the published codebase. The CPIO API 144 can communicate PCRs of the deployed business logic 142 to other parties (i.e., to the client device 102, to other components of the cloud platform 122 or the computing system 100) to attest that the deployed business logic 142 corresponds to the released codebase and has not been altered.

Thus, in the requests 310, 312 that the DP 128 transmits, the business logic 142 can include, using the CPIO API 144, the PCRs for the deployed business logic 142. Alternatively or in addition, the Trusted Parties 166, 172 can request the PCRs. The Trusted Parties 166, 172 can then confirm that the deployed images match the PCRs of the published codebase. After performing this verification process, the Trusted Parties 166, 172 can release 314, 316 the key splits to the DP 128. Likewise, the KMS 164 can also verify that the binary image deployed on the DP 128 is attested, and release symmetric decryption keys only to attested DP binaries running in the TEE 124.

The business logic 142 then assembles 318 the private decryption key from the key splits, and can store the assembled private key in the key cache 146. Assembly of the private key occurs only in the TEE 124, and the CPIO API 144 utilizes a secure channel and authentication when communicating with the Trusted Parties 166, 172. Since each Trusted Party 166, 172 contains only part of each key, whole private keys only exist within the secure TEE 124 after the key splits are combined. Thus, this prevents any single party from exfiltrating cleartext data or private keys. The business logic 142 retrieves 320 the private key from the key cache 146 and uses the private key to decrypt the request. Before processing the request, the business logic 142 may verify 322 that there is privacy budget available to process the request. The business logic 142 may perform such verifications by communicating with the privacy budget service 270, 272, and/or 154, in accordance with the CPIO API 144. The business logic 142 can then process 324 the request. Before storing 326 the result of the processing, the business logic 142 in some cases checks again whether privacy budget is still available. The business logic 142 can then 326 encrypt and store the result for later retrieval. For encryption, the business logic 142 can either use a system-provided or a Customer-Managed Encryption Key (CMEK) for encryption at rest. The result is then ready for retrieval and consumption by any party possessing the CMEK key (e.g., the administrator, the client device 102, the third party server 136, etc.).

Turning to FIG. 4, a scenario 400 depicts additional details regarding the split key architecture discussed above. In particular, the scheme discloses herein utilizes envelope encryption and distributed bit-split private keys to protect the private keys used for securing sensitive data from being collected by malicious parties. The sequence illustrated in FIG. 4 illustrates how split keys can be generated and distributed. The symmetric key pairs used for encryption and decryption of sensitive data are generated within trusted servers/enclaves (e.g., the Trusted Parties 166, 172, a Key Generation Enclave 402, described below). The public keys for each pair are distributed openly, but each private key is bit-split between N Trusted Parties in a secure way. The SCP 126 uses remote attestation of binaries and secure communication channels to guarantee the integrity of this process. Bit-splitting each private key between all of the Trusted Parties ensures that no Trusted Party can get access to any whole private keys by acting alone. The most common configuration, as illustrated in FIGS. 2B and 3, utilizes N=2, such that there are two Trusted Parties (i.e., the Trusted Parties 166 and 172). However, it should be understood that the techniques described herein can be extended to key splits among N Trusted Parties.

Assuming N=2, the Trusted Party 1 166 deploys the attested binary which includes the logic for creating/rotating the asymmetric keys to a secure enclave (e.g., the Key Generation Enclave 402). The Trusted Party 2 172 configures the KMS 164 to only allow this attested binary to encrypt the split. Once the Trusted Party 2 172 receives the encrypted split, it decrypts the encrypted split and re-encrypts the split with a new symmetric key unknown to any other stakeholder. If the attested binary does not match, the key generation enclave will not be able to decrypt the symmetric key of Trusted Party 2 172, which is needed to encrypt the split key. The encrypted key split for Trusted Party 2 172 is now stored in a datastore accessible to Trusted Party 2 172. The key split corresponding to Trusted Party 1 166 is simply encrypted and stored by Trusted Party 1 166. At this point, the private key required to decrypt incoming request payloads is bit-split among the Trusted Parties, and each split is encrypted and stored in a way that only the DP binary can decrypt, combine, and use. An example of this process is illustrated in FIG. 4.

In the scenario 400, Trusted Party 1 166 generates 404 a symmetric key ke_1 and stores the symmetric key ke_1 in the KMS 164. Similarly, Trusted Party 2 172 generates 406 a symmetric key ke_2 and stores the symmetric ke_2 in the KMS 164. The KMS 164 is configured such that decryption using the keys ke_1 and ke_2 is only allowed by attested DP binaries. Trusted Party 2 172 generates 408 a symmetric key k_2, and generates 410 a cloud KMS symmetric key k_kms (i.e., generates 410 k_kms on the cloud KMS 164). The Trusted Party 2 172 encrypts the symmetric key k_2 with the KMS 164 symmetric key, k_kms. The key k_2 will be released to the attested binary running in a Key Generation Enclave 402 for encrypting the key split for the Trusted Party 2 172. Events 404, 406, 408, and 410 collectively define an initial setup procedure.

The Key Generation Enclave 402 is another TEE (i.e., a different TEE from the TEE 124) that generates and splits keys, and may be operated on servers on or off the cloud platform 122. Similar to the DP 128, the Key Generation Enclave 402 has an attested image that can be verified by other parties. Both Trusted Parties 166, 172 agree upon the image binary that will be used by the Key Generation Enclave 402 to create keys. One of the Trusted Parties 166, 172 can be the administrator of the Key Generation Enclave 402. However, if the party running the binary makes any changes to the code, it will not be able to send the split share to the other trusted party. This is because the Key Generation Enclave 402 cannot decrypt the encrypted symmetric key sent by the other party if the image hash changes.

The Key Generation Enclave 402 generates keys within a secure execution environment, such that no entity outside the Key Generation Enclave 402 can see how the keys are generated. The Key Generation Enclave 402 generates 412 an asymmetric key pair including a public key and a private key, p. The Key Generation Enclave 402 publishes the public key (e.g., to the Public Key Distribution Service 278), and bit-splits 414 the private key into key fragments p_1 and p_2. The Key Generation Enclave 402 then requests 416 an encrypted symmetric key from the Trusted Party 2 172. The Trusted Party 2 172 can request 418 the KMS 164 to encrypt k_2 with k_kms, and receives 420 k_kms(k_2) (i.e., k_2 encrypted with k_kms) from the KMS 164. The Trusted Party 2 172 provides 422 the encrypted symmetric key k_kms(k_2) to the Key Generation Enclave 402. Only the attested binary running in the Key Generation Enclave 402 can decrypt this encrypted key by making a request to the KMS 164. Accordingly, the Key Generation Enclave 402 requests 424 the KMS 164 to decrypt k_kms(k_2), and receives 426 the decrypted symmetric key k_2 from the KMS 164.

The Key Generation Enclave 402 can then encrypt 428 the Trusted Party 2 172 split private key p_2 using the symmetric key k_2, and provide 430 the encrypted key split k_2 (p_2) to the Trusted Party 2 172. Note that the encryption operation 428 occurs within the Key Generation Enclave 402 and is not observable by Trusted Party 1 166, or any other stakeholder. The Key Generation Enclave 402 also sends 432 the key split p_1 to the Trusted Party 1 166, either unencrypted or encrypted. The Trusted Party 2 172 decrypts 434 k_2 (p_2) with k_2, and re-encrypts 436 p_2 with the symmetric key ke_2 (e.g., the Trusted Party 2 172 requests 436 the KMS 164 to encrypt p_2 with ke_2, and receives 438 ke_2 (p_2) from the KMS 164). The KMS 164 is configured such that decryption using ke_2 can only be done by the attested DP binary. Similarly, the Trusted Party 1 166 encrypts 440 the key split p_1 using ke_1 (e.g., the Trusted Party 1 166 requests 440 the KMS 164 to encrypt p_1 with ke_1, and receives 442 ke_1 (p_1) from the KMS 164. The KMS 164 is configured such that decryption using ke_1 can only be done by the attested DP binary. At this point, the private key p required to decrypt incoming requests at the DP binary is bit-split among the Trusted Parties and each split is encrypted and stored in a way that only the DP binary can decrypt and combine.

Figure 5:
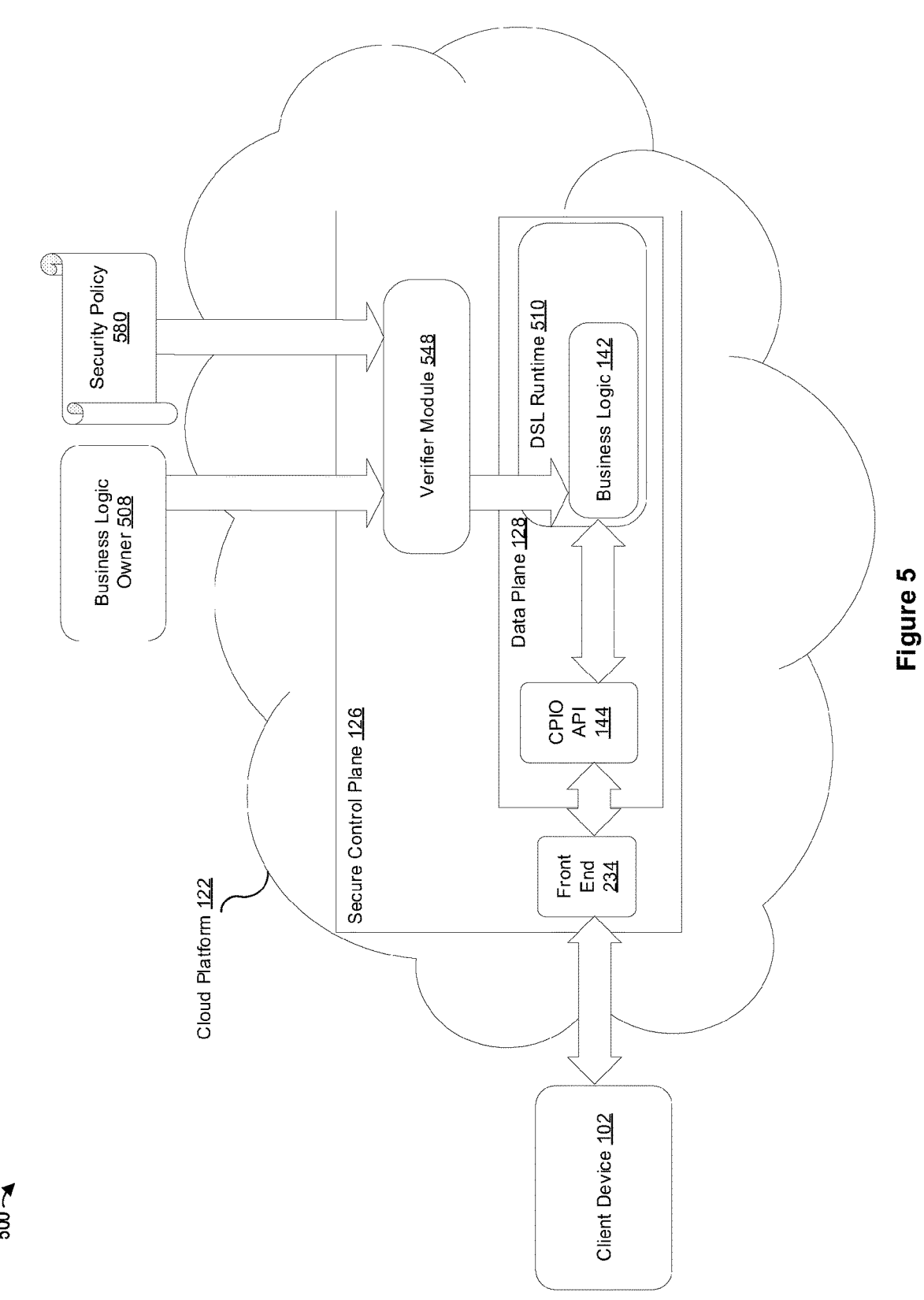
FIG. 5 is a block diagram illustrating another example computing architecture similar to FIG. 2A, except that FIG. 5 illustrates additional infrastructure for verifying that the logic executing on the data plane adheres the requirements of a security policy.

Referring next to FIG. 5, FIG. 5 illustrates an architecture 500 in which the techniques of this disclosure for providing privacy and security guarantees to parties when proprietary business logic cannot be audited can be performed. As discussed above, the SCP 126 enables other parties to audit the logic 142 deployed on the DP 128. However, attestation of the logic 142 requires other parties to be able to build the code and generate the cryptographic hashes discussed above. In some workflows, the logic 142 is proprietary, and therefore the business logic codebase is not available for auditing and attestation. Other parties, however, still desire safeguards that privacy and security guarantees are being maintained.

An alternative to attestation of the logic 142 is to automatically perform a formal verification of the behavior of the logic 142 without human intervention. The mechanism to perform the formal verification, which may all or in part be performed by a verifier module 548 implemented within the TEE 124, can itself be audited and attested. The verifier module 548 can check that dangerous behaviors (i.e., behaviors that violate security policies) are not possible at runtime of the logic 142, regardless of the details of the algorithm in the logic 142.

In particular, there are two aspects regarding the logic 142 that must be verified. First, input/output (I/O) must be marshalled, so that the binary running the business logic does not, for example, open a remote network connection to dump sensitive data to another server. Second, the provenance of data must be traced for all output, so that sensitive data present in the input cannot be combined, encrypted, or disguised into an apparently safe output (e.g., using steganography to exfiltrate data). The first aspect, marshaling of the logic 142 I/O can be implemented by the CPIO API 144 or lower-level layers of the SCP 126. These SCP layers can be audited and attested. Provenance of data is more complex, as it requires some degree of introspection in the business logic and understanding of the potential behaviors of the system.

Turning to FIG. 5, the architecture 500 provides one solution to the issue of making privacy and security guarantees when the business logic 142 is proprietary. The architecture 500 uses an automatic verifier (i.e., the verifier module 548) and policies to define which behaviors are forbidden. Instead of arbitrarily-defined operations, the architecture 500 may use a choice of Domain-Specific Languages (DSL) to express the business logic 142 (e.g., Structured Query Language (SQL)). In an example implementation, the payload of the business logic 142 is written in a language that the verifier module 548 can analyze (e.g., be written as an SQL query).

An owner 502 of the business logic 142 provides the business logic 142 to the SCP 126. When the SCP 126 instance is launched, the business logic 142 is run through the verifier module 548. The verifier module 548 runs within the TEE 124. The business logic 142 executes on the DP 128 within a DSL runtime 510. The verifier module 548 checks the business logic 142 against one or more policies, such as the security policy 580. The verifier module 548 can retrieve the security policy 580 from the public security policy storage 180, for example. Taking the example mentioned above, the payload of the business logic 142 may be written as an SQL query. The security policy 580 may specify that certain columns may be joined on, but not output. The verifier module 548 can check whether business logic 142 complies with this requirement. Those skilled in the art will recognize that the business logic 142 may be specified in a variety of domain specific languages other than SQL, such that business logic 142 specified in such a language can be automatically checked for policy compliance. More generally, the verifier module 548 can trace and verify output data provenance and processing according to the security policy 580. The verifier module 548 can check that no malicious operations can be expressed, such as "open a network connection and send data to an unknown server."

The payload of the business logic 142, i.e., the algorithm, is kept secret. Thus, all other elements of the architecture 500 can be audited and attested, including the verifier module 548. The security policy 580 describes which actions and/or fields are allowed in order to compose the output of the business logic 142. The security policy 580 is public, and is essentially a machine-readable and machine-enforceable PDD. If the verifier module 548 successfully determines that the payload of the logic 142 is safe according to the security policy 580, execution of the logic 142 progresses. Otherwise, execution is not allowed for that payload. The verifier module 548 and the architecture 500 can be combined with the architectures 200A and 200B described previously.

As one example of proprietary business logic, a first party (e.g., the owner 502) may offer a matching service, and deploy this matching service to the SCP 126. The matching service takes 1P data from a second party as input, matches personal identifiable information (PII) (e.g., phone number, email address, social security number) in that 1P data to PII provided by the second party, and outputs a matching table that maps a customer ID space for the second party to a customer ID space for the first party. The second party seeks a guarantee that the first party cannot learn any new PII from the ingested IP data, and the first party seeks a guarantee that the exact matching algorithm is not disclosed.

The deployed service may include a matching engine and a matching policy, where the matching policy is the portion of the matching engine that is not disclosed, and provides the algorithm for how the matching is performed (e.g., first match by phone number, second match by email address). Thus, the matching policy may correspond to the business logic 142. The security policy (e.g., the security policy 580) is publicly disclosed and describes what fields from the input can be used for matching and what fields of the input cannot participate to generate an output. The verifier module 548 can check whether the matching policy violates this security policy, and stop execution of the matching policy if there is a violation, thereby ensuring the second party's guarantees to their users without disclosing the matching policy.

Below, several ownership considerations are discussed that are applicable to the foregoing discussion.

Because the DP source code (i.e., the business logic 142) is audited by the relevant stakeholders, and the code running within the enclaves is attested, the DP (i.e., the DP container) can be written by any party without effect on the security or privacy properties of the system. However, there are considerations depending on who is the administrator of the service, who manages the keys and KMS configuration, and who writes and operates the privacy budget service. Some of the valid secure setups, assuming a two-way key split is used, are discussed in Table 1 below.

related processes is harder if the processes are deployed in different environments (i.e., different clouds), and if there are security measures in the hardware preventing other processes from accessing the MPC processes' memory space.

TABLE 1

Notes on Ownership Models

| Administrator (DP enclave owner) | Key Split 1 | Key Split 2 | Setup notes | Data breach is possible if there is a: |
|---|---|---|---|---|
| Third party between the client device 102 and the TEE 124 | Trusted Party 1 | Trusted Party 2 | The third party can audit the business logic 142. Both the author of the client business logic 142 and the third party trust at least one of the Trusted Parties (TPs). The author can then trust that the third party can only process requests if the DP has not been tampered with. The third party can trust that the author has no access to encrypted data, and both the third party and the author can trust that neither party has access to decryption keys or cleartext data. | 3-way collusion: Both TPs cooperate (or "collude") with the third party to share the split keys. The third party combines key splits and decrypts the encrypted batches of requests. |
| Author of the DP business logic 142 | Author of the DP business logic 142 | Trusted Party 1 | This is a minimal number of stakeholders setup that guarantees that the author of the business logic cannot see unprocessed (e.g., per-event) data in cleartext. TP 1 can also audit the codebase in the DP to provide a higher degree of trust. | 2-way collusion (can be enhanced to 3-way): Author of the DP business logic 142 and TP 1 cooperate to deploy a crafted DP. TP1 and the author configure KMSs to release key material to this new DP hash, and the author sends the encrypted batches for processing. A second TP can be used instead of the author to enhance security to 3-way collusion. |
| Third party | Third party | Author of the business logic 142 | Another minimal number of stakeholders setup that guarantees that neither the author nor the third party can see unprocessed (e.g., per-event) data in cleartext. Both the third party and the author can audit the codebase. | 2-way collusion (can be enhanced to 3-way): Author and third party cooperate to deploy a crafted DP. Third party and author configure KMSs to release key material to this new DP hash, and third party sends the encrypted batches for processing. A TP can be used instead of the third party to enhance security to 3-way collusion |

There are also multi-party computation (MPC) considerations applicable to the foregoing discussion. MPC provides security by delocalizing data and computation. Breaching MPC systems can be possible by capturing the internal state (e.g., memory dump) of all participant instances and combining that information, or if a party were able to collect keys to decrypt the input data from both MPC servers. As a technology, MPC is orthogonal to the TEE/enclave approach described herein. Depending on the desired security and operational cost properties of the system, both technologies could be used independently or in combination. For a malicious actor, capturing the internal state of a couple of The SCP (e.g., the SCP 126) provides both of these protections, by having the ability to deploy instances of the same business logic in different cloud providers, and by protecting the memory of the process running within the enclave by using hardware (confidential computing) to either lock-out the address space of the sensitive processes or to encrypt it.

Layering both MPC and TEE technologies adds additional security which helps prevent malicious external and internal actors from modifying the execution or policy engine.

ADDITIONAL CONSIDERATIONS

The following additional considerations apply to the foregoing discussion.

A client device in which the techniques of this disclosure can be implemented (e.g., the client device 102) can be any suitable device capable of wireless communications such as a smartphone, a tablet computer, a laptop computer, a desktop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the client device in some cases may be embedded in an electronic system such as the head unit of a vehicle or an advanced driver assistance system (ADAS). Still further, the client device can operate as an internet-of-things (IoT) device or a mobile-internet device (MID). Depending on the type, the client device can include one or more general-purpose processors, a computer-readable memory, a user interface, one or more network interfaces, one or more sensors, etc.

Certain embodiments are described in this disclosure as including logic or a number of components or modules. Modules may be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in a plurality of servers of a cloud computing platform for processing sensitive data, the method comprising:

receiving, by a first subset of the plurality of servers, an encrypted request from a client device, wherein the first subset performs functions of a secure control plane associated with a service, and a second subset of the plurality of servers performs functions of a data plane associated with the service;

passing, by the first subset, the encrypted request to the second subset, the second subset being contained in a trusted execution environment;

retrieving, by the second subset, a private key for decrypting the encrypted request, wherein the secure control plane does not have access to the private key;

decrypting, by the second subset, the encrypted request in the trusted execution environment;

processing, by the second subset, the decrypted request according to logic deployed on the second subset;

encrypting, by the second subset, the result of the processing; and passing, by the second subset, the encrypted result outside the trusted execution environment.

2. The method of claim 1, wherein retrieving the private key includes:

receiving, from a first trusted party, a first portion of the private key;

receiving, from a second trusted party, a second portion of the private key; and assembling, in the trusted execution environment, the private key using the first portion and the second portion.

3. The method of claim 2, wherein retrieving the private key includes:

providing, to a key management service, attestation of the logic deployed on the second subset.

4. The method of claim 3, wherein providing the attestation includes:

providing a cryptographic hash generated by building the logic on the second subset.

5. The method of claim 1, further comprising:

receiving, from a trusted party, a request for a cryptographic hash corresponding to a codebase; and providing the cryptographic hash to the trusted party in response to the request.

6. The method of claim 1, further comprising:

analyzing, by the first subset, whether the logic violates a policy, the policy defining how input data can be processed.

7. The method of claim 6, wherein the policy indicates which fields from the input data can be used for matching.

8. The method of claim 1, wherein processing the decrypted request includes:

determining that privacy budget associated with the client device is available for processing the request.

9. The method of claim 8, wherein determining that the privacy budget is available includes communicating with a first trusted party and a second trusted party, wherein a budget service is distributed among at least the first trusted party and the second trusted party.

10. The method of claim 1, wherein the encrypted request from the client device is a request to perform a computation on a dataset received from the client device, using the logic deployed on the second subset.

11. The method of claim 10, wherein the logic and the dataset are received from different respective clients.

12. A plurality of servers of a cloud computing platform configured to process sensitive data, the plurality of servers configured to:

receive, by a first subset of the plurality of servers, an encrypted request from a client device, wherein the first subset performs functions of a secure control plane associated with a service, and a second subset of the plurality of servers performs functions of a data plane associated with the service;

pass, by the first subset, the encrypted request to the second subset, the second subset being contained in a trusted execution environment;

retrieve, by the second subset, a private key for decrypting the encrypted request, wherein the secure control plane does not have access to the private key;

decrypt, by the second subset, the encrypted request in the trusted execution environment;

process, by the second subset, the decrypted request according to logic deployed on the second subset;

encrypt, by the second subset, the result of the processing; and pass, by the second subset, the encrypted result outside the trusted execution environment.

13. The plurality of servers of claim 12, wherein retrieving the private key includes:

receiving, from a first trusted party, a first portion of the private key;

receiving, from a second trusted party, a second portion of the private key; and assembling, in the trusted execution environment, the private key using the first portion and the second portion.

14. The plurality of servers of claim 12, wherein retrieving the private key includes:

providing, to a key management service, attestation of the logic deployed on the second subset.

15. The plurality of servers of claim 13, wherein providing the attestation includes:

providing a cryptographic hash generated by building the logic on the second subset.

16. The plurality of servers of claim 12, wherein the plurality of servers is further configured to:

receive, from a trusted party, a request for a cryptographic hash corresponding to a codebase; and provide the cryptographic hash to the trusted party in response to the request.

17. The plurality of servers of claim 12, wherein the plurality of servers is further configured to:

analyze, by the first subset, whether the logic violates a policy, the policy defining how input data can be processed.

18. The plurality of servers of claim 12, wherein processing the decrypted request includes:

determining that privacy budget associated with the client device is available for processing the request.

19. The plurality of servers of claim 18, wherein determining that the privacy budget is available includes communicating with a first trusted party and a second trusted party, wherein a budget service is distributed among at least the first trusted party and the second trusted party.

20. The plurality of servers of claim 12, wherein the encrypted request from the client device is a request to perform a computation on a dataset received from the client device, using the logic deployed on the second subset.

* * * * *